United States Patent
Tsukada

(10) Patent No.: US 7,822,269 B2
(45) Date of Patent: Oct. 26, 2010

(54) PROJECTOR COLOR CORRECTING METHOD

(75) Inventor: Masato Tsukada, Minato-ku (JP)

(73) Assignee: Nec Corporation, Tokyo (JP)

( * ) Notice: Subject to any disclaimer, the term of this patent is extended or adjusted under 35 U.S.C. 154(b) by 1151 days.

(21) Appl. No.: 10/582,542

(22) PCT Filed: Nov. 19, 2004

(86) PCT No.: PCT/JP2004/017287

§ 371 (c)(1),
(2), (4) Date: Jun. 9, 2006

(87) PCT Pub. No.: WO2005/057941

PCT Pub. Date: Jun. 23, 2005

(65) Prior Publication Data

US 2007/0110304 A1    May 17, 2007

(30) Foreign Application Priority Data

Dec. 10, 2003    (JP)    ............................. 2003-412503

(51) Int. Cl.
*G06K 9/00*    (2006.01)
(52) U.S. Cl. .................................................... 382/167
(58) Field of Classification Search ......... 382/162–167, 382/284; 358/500–523; 345/589–607; 356/603–612, 356/620; 353/28–34; 348/602–604
See application file for complete search history.

(56) References Cited

U.S. PATENT DOCUMENTS

| | | | |
|---|---|---|---|
| 7,061,547 B2 * | 6/2006 | Wada | 348/602 |
| 7,110,002 B2 * | 9/2006 | Wada | 345/600 |
| 2003/0007098 A1 * | 1/2003 | Wada | 348/603 |
| 2003/0011563 A1 | 1/2003 | Wada | |
| 2003/0142883 A1 * | 7/2003 | Ishii | 382/284 |

FOREIGN PATENT DOCUMENTS

| | | |
|---|---|---|
| CN | 1381037 A | 11/2002 |
| EP | 1058158 A2 | 12/2000 |
| EP | 1202560 A2 | 5/2002 |
| JP | 11-313346 | 11/1999 |
| JP | 2000-102042 A | 4/2000 |

(Continued)

*Primary Examiner*—Sherali Ishrat
(74) *Attorney, Agent, or Firm*—Sughrue Mion, PLLC

(57) ABSTRACT

When a projection plane is not uniform due to colors and patterns on the projection plane and ambient environmental light, a reproduced image projected by a projector is made to appear in desired colors. A color correcting apparatus is used, comprising association unit (21), association storage memory 22, color information acquisition unit (23), color conversion calculation unit (23), color conversion storage memory (25), and color correction unit (26). Association unit (21) acquires captured image (7) generated by capturing image (5) projected onto projection plane (2) to establish an association between pixels of image (5) and pixels of captured image (7). Association storage memory (22) records the association. Color information acquisition unit (23) acquires second color information as color information for each pixel of the captured image. Color conversion calculation unit (23) calculates a color conversion for each pixel of the image based on first color information, second color information, and the association. Color conversion storage memory (25) records the color conversion. Color correction unit (26) corrects the input image for colors on a pixel-by-pixel basis using the color conversion.

12 Claims, 9 Drawing Sheets

FOREIGN PATENT DOCUMENTS

| | | |
|---|---|---|
| JP | 2000-316170 | 11/2000 |
| JP | 2001-054131 | 2/2001 |
| JP | 2001-320725 | 11/2001 |
| JP | 2002-041016 | 2/2002 |
| JP | 2002-125125 | 4/2002 |
| JP | 2002-204374 | 7/2002 |
| JP | 2003-050572 | 2/2003 |
| JP | 2003-219324 | 7/2003 |

\* cited by examiner

PROJECTOR COLOR CORRECTING METHOD

This application claims priority from PCT Application No. PCT/JP2004/017287 filed Nov. 19, 2004, and from Japanese Patent Application No. 2003-412503 filed Dec. 10, 2003, which applications are incorporated herein by reference.

TECHNICAL FIELD

The present invention relates to a projector color correcting apparatus, a projector color correcting method, and a projector, and more particularly, to a projector color correcting apparatus which improves the accuracy of color reproduction, a projector color correcting method, and a projector to which they are applied.

BACKGROUND ART

A projector is used for projecting an image onto a projection plane such as a screen. For using such a projector, a projector color correcting method has been known for correcting an image on the projection plane for colors such that the colors precisely match colors recorded in image data.

For example, JP-A-2001-320725 discloses a technique for an environment adaptive image processing method for correcting colors projected by a projector. This technique corrects images for colors in accordance with visual environments. Then, this technique includes a step of capturing a visual environment, a step of converting the captured visual environment into coordinate values in a predetermined color space, a step of correcting input/output data for display based on coordinate values in a predetermined color space of a predetermined color in a predetermined reference environment correcting, the converted coordinate values, and coordinate values which form a complementary color pair with the converted coordinate values, and a step of displaying an image based on the corrected input/output data.

In this color correcting method, input/output characteristic data for display, used by image display means, is corrected on the basis of coordinate values which reflect projector environment information and the coordinate values which form a complementary color pair, thereby realizing the reproduction of colors which are adapted to an environment during display. A specific color reproducing method involves capturing color information (RGB, XYZ or the like) available from the projection plane of a white image using a color sensor, and mapping color information on the captured white image to an original CIELAB color space at a previously set standard white. In this event, if the standard white does not reside on an L-axis, a bound vector is calculated from the L-axis on an ab plane of the white, and a color corresponding to the position of the opposite vector from the L-axis, i.e., a complementary color, is found and supplied as a corrected color. Actually, this processing is performed on a plurality of halftone achromatic colors other than the whitecolor, and this is realized in a form of storage in gamma correction LUT.

Such a conventional projector color correcting method is premised on the projection plane in a uniform color, which is a factor that affects color reproduction of a projector. Therefore, a more precise color correction cannot be accomplished if the projection plane is not uniform in color. The reason for that lies in that the conventional color correcting method, though acquiring color information on the projection plane, fails to acquire detailed color information corresponding to the pixel level of a projected image, and can therefore perform color correction processing only for one type of color corresponding to the averaged color on the projection plane.

In addition, the conventional projector color correcting method is premised on the absence of patterns on the projection plane, which is a factor that affects the color reproduction of a projector. Therefore, a more precise color correction cannot be accomplished if patterns exists in the projection plane. The reason for that lies in that the conventional color correcting method, though acquiring color information on the projection plane, fails to acquire detailed color information corresponding to the pixel level of a projected image, and can therefore perform color correction processing only for one type of color corresponding to the averaged color on the projection plane.

Further, the conventional projector color correcting method is premise on environmental light uniformly impinging on the projection plane, which is a factor that affects the color reproduction of the projector. Therefore, a more precise color correction cannot be accomplished if the environmental light does not uniformly impinge on the projection plane. The reason for that lies in that the conventional color correcting method, though acquiring color information on environmental light on the projection plane, fails to acquire detailed color information corresponding to the pixel level of a projected image, and can therefore perform color correction processing only for one type of color corresponding to averaged environmental light on the projection plane.

A desire exists for techniques which are capable of improving the accuracy of color reproduction of a projector. A desire exists for techniques which are capable of realizing stable color reproduction even in a situation where the projection plane of a projector is not uniform in color. A desire exists for techniques which are capable of realizing stable color reproduction even in a situation where environmental light does not uniformly impinge on the projection plane of a projector.

As a related technique, JP-A-2000-31670 discloses a technique for a color uniformity correcting method. This technique is a color uniformity correcting method for displayed colors on an optical display plane on which a displayed color image is generated by the image generator of a display device. The optical display plane on which a reference color image is displayed by reference color image data applied to the image generator is partitioned into a plurality of triangular areas. Color coordinates are measured at reference pixels positioned at three apices of the respective triangular areas. A luminance correction amount is determined at the reference pixel simultaneously. The luminance correction amount is found according to a predetermined function at each of the pixels within the respective triangular areas based on the luminance correction amounts at the three reference pixels in the respective triangular areas. Color image data corresponding to each pixel in the respective triangular areas, applied to the image generator, is corrected in accordance with the luminance correction amount.

This technique is intended to appropriately determine a proper amount for correcting lack of uniformity in colors on the display screen in order to carry out appropriate corrections of the details on the display screen.

JP-A-11-313346 discloses a technique for a projected video image testing apparatus. This technique is configured to measure an absolute optical amount of a projected video image based on a comparison of an optical amount by an optical sensor mounted on a screen with an optical amount of a portion corresponding to the position of the optical sensor in the imaged data of the projected video image on the screen to generate the result of the measurement.

JP-A-2002-41016 discloses a technique for an environment adaptive image display system. The image display system based on this technique is an image display system for correcting and displaying an image based on environment information indicative of the visual environment in a displayed area of the image. The system includes means for storing, and correcting means for correcting. The means for storing stores brightness correction information for correcting the image for brightness based on the environment information, and color correction information for correcting the image for colors based on the environment information. The correcting means for correcting corrects image information for displaying on image based on the brightness correction information and the color correction information.

JP-A-2002-125125 discloses a technique for an environment adaptive image display system. The image display system based on this technique is an image display system for correcting and displaying an image based on environment information indicative of the visual environment in a displayed area of the image. The system includes correcting means for correcting display input/output characteristic data for use by means for displaying the image to increase the output, at least in a low halftone band, based on the environment information when there is the influence of environment light.

JP-A-2003-50572 discloses a technique for an image display system. The image display system based on this technique is an image display system for correcting an image for halftone in accordance with an environment. The system includes image displaying means, environment capturing means, and halftone correcting means. The image displaying means displays a calibration image. The environment capturing means captures an environment in which the image displaying means is used to generate use environment information indicative of the use environment. The halftone correcting means makes the halftone correction based on the use environment information. The image displaying means displays calibration images in the same color but at two different halftone levels, and displays an image which has been corrected for halftone. The environment capturing means generates two types of use environment information in a state where the calibration image at each halftone level is displayed. The halftone correcting means makes the halftone correction based on the difference between two types of ideal environment information indicative of environments which are captured when the calibration images at two halftone levels are displayed under an ideal environment, and based on the difference between the two types of use environment information.

DISCLOSURE OF THE INVENTION

It is an object of the present invention to provide a projector color correcting apparatus which is capable of realizing stable color reproduction even in a situation where a projection plane of the projector is not uniform in colors, a projector color correcting method, and a projector to which they are applied.

It is another object of the present invention to provide a projector color correcting apparatus which is capable of realizing stable color reproduction even in a situation where there are patterns on a projection plane of the projector, a projector color correcting method, and a projector to which they are applied.

It is a further object of the present invention to provide a projector color correcting apparatus which is capable of realizing stable color reproduction in a situation where environmental light does not uniformly impinge on a projection plane of the projector, a projector color correcting method, and a projector to which they are applied.

It is another object of the present invention to provide a projector color correcting apparatus which is capable of alleviating the influence of lacking of uniformity in colors on a projection plane of the projector, if the projector itself has lacking of uniformity in colors on a projection plane of the projector, a projector color correcting method, and a projector to which they are applied.

In the following, means for solving the problems will be described using reference numerals and symbols used in the best mode for carrying out the invention. These reference numerals and symbols are added in parenthesis in order to clarify the association between descriptions in claims and the best mode for carrying out the invention. However, these reference numerals or symbols should not be used for interpreting the technical scope of the invention described in the claims.

To solve the problems mentioned above, a projector color correcting method of the present invention comprises a color conversion generation step for generating color conversion for each of the pixels or blocks of an image (5) based on previously set first color information (XW1, YW1, ZW1) on image (5) and second color information (XW2, YX2, ZW2/X2, Y2, Z2) on image (7) which is image (5) projected onto projection plane (2), and a color correction step for correcting input image (Dl) for colors on a pixel-by-pixel or block-by-block basis using the color conversion.

In the projector color correction method, the color conversion generation step comprises an input step for receiving input through user interface (48), and a conversion step for generating color conversion based on the input.

In the projector color correcting method, the color conversion generation step comprises a color information acquisition step for acquiring second color information (XW2, YW2, ZW2) as color information for each pixel or block of image (7) on the projection plane, and a color conversion calculation step for calculating the color conversion for each pixel or block of image (5) based on first color information (XW1, YW1, ZW1) and second color information (XW2, YW2, ZW2).

In the projector color correcting method, the color conversion generation step comprises an association step for projecting image (5) onto projection plane (2), and capturing the image to acquire captured image (7) for establishing an association between pixels or blocks of image (5) and pixels or blocks of captured image (7), a color information acquisition step for acquiring second color information (XW2, YW2, ZW2) color information for each pixel or blocks of captured image (7), and a color conversion calculation step for calculating a color conversion for each pixel or block of image (5) based on first color information (XW1, YW1, ZW1), second color information (XW2, YW2, ZW2), and the association of pixels or blocks.

In the projector color correcting method, the color conversion generation step comprises an association step for projecting pattern image (5) onto projection plane (2), and capturing the pattern image to acquire captured pattern image (7) for establishing an association of pixels or blocks of pattern image (5) with pixels or blocks of captured pattern image (7), a color information acquisition step for projecting color image (5*c*) onto projection plane (2), capturing the color image to acquire captured color image (7*c*), and acquiring second color information (XW2, YW2, ZW2) as color information for each pixel or block of captured color image (7*c*), and a color conversion calculation step for calculating a color conversion for each pixel or block of color image (5) based on first color information (XW1, YW1, ZW1), second color information (XW2, YW2, ZW2), and the association of pixels or blocks.

In the projector color correcting method, image (5) or pattern image (5) is presented as a plurality of images, an associated captured image is acquired as a captured image associated with the plurality of images, and the associated captured image is scanned to establish an association of the pixel or block of image (5) or pattern image (5) with the pixels or blocks of captured image (7) or captured pattern image (7).

In the projector color correcting method, the color conversion generation step comprises a feature point association step for projecting pattern image (5) onto projection plane (2), capturing the pattern image to acquire captured pattern image (7), and establishing an association of feature points of pattern image (5) with feature points of captured pattern image (7), a feature point color information acquisition step for projecting color image (5c) onto projection plane (2), capturing the color image to acquire captured color image (7c), and acquiring second color information (XW2, YW2, ZW2) as color information on the feature points of captured color image (7c), a feature point color conversion calculation step for calculating the color conversion for the feature points of color image (5c) from previously set first color information (XW1, YW1, ZW1), second color information (XW2, YW2, ZW2), and the association of pixels or blocks, and a color conversion calculation step for calculating the color conversion for each pixel or block of the input image, and for calculating the color conversion for the feature points from a color conversion for representative points.

In the projector color correcting method, the color conversion comprises an equation or a lookup table or a combination thereof.

To solve the problems mentioned above, a projector color correcting apparatus of the present invention comprises color conversion generation unit (27/38) and color correction unit (26/36). Color conversion generation unit (27/38) generates the color conversion for each of pixels or blocks of image (2) based on previously set first color information (XW1, YW1, ZW1) and second color information (XW2, YW2, ZW2) on image (7) projected onto projection plane (2). Color correction unit (26/36) corrects colors of the input image for colors on a pixel-by-pixel or block-by-block basis using the color conversion.

In the projector color correcting apparatus, color conversion generation unit (27) comprises a conversion unit for generating color conversion based on an input through user interface (38).

In the projector color correcting apparatus, the color conversion generation unit comprises association unit (21), association storage memory (22), color information acquisition unit (23), color conversion calculation unit (23), and color conversion storage memory (25). Association unit (21) acquires captured image (7) generated by capturing image (5) projected onto projection plane (2) to establish an association between pixels or blocks of image (5) and pixels or blocks of captured image (7). Association storage memory (22) records the association. Color information acquisition unit (23) acquires second color information (XW2, YW2, ZW2) as color information for each pixel or block of captured image (7). Color conversion calculation unit (23) calculates the color conversion for each pixel or block of image (5) based on first color information (XW1, YW1, ZW1), second color information (XW2, YW2, ZW2), and the association. Color conversion storage memory (25) records the color conversion of pixels or blocks.

In the projector color correcting apparatus, color conversion generation unit (27) comprises association unit (21), association storage memory (22), color information acquisition unit (23), color conversion calculation unit (23), and color conversion storage memory (25). Association unit (21) acquires captured pattern image (7) generated by capturing pattern image (5) projected onto projection plane (2) to establish an association of pixels or blocks of pattern image (5) with pixels or blocks of captured pattern image (7). Association storage memory (22) records the association of pixels or blocks. Color information acquisition unit (23) captures captured color image (7c) generated by capturing color image (5c) projected onto projection plane (2) to acquire second color information (XW2, YW2, ZW2) as color information for each pixel or block of captured color image (7c). Color conversion calculation unit (23) calculates the color conversion for each pixel or block of color image (5c) based on first color information (XW1, YW1, ZW1), second color information (XW2, YW2, ZW2), and the association of pixels or blocks. The color conversion storage memory records the color conversion.

In the projector color correcting apparatus, association unit (38) presents a plurality of images (5) or pattern images (5), acquires an associated captured image as a captured image associated with the plurality of images, and scans the associated captured image to establish an association of the pixels or blocks of image (5) or pattern image (5) with the pixels or blocks of captured image (7) or captured pattern image (7).

In the projector color correcting apparatus, color conversion generation unit (38) comprises feature point association unit (31), association storage memory (32), feature point color information acquisition unit (33), feature point color conversion calculation unit (33), color conversion storage memory (35), and color conversion calculation unit (37). Feature point association unit (31) captures captured pattern image (7) generated by capturing pattern image (5) projected onto projection plane (2), and establishes an association of feature points of pattern image (5) with feature points of captured pattern image (7). Association storage memory (32) records the association. Feature point color information acquisition unit (33) acquires captured color image (7c) generated by capturing color image (5c) projected onto projection plane (2), and acquires second color information (XW2, YW2, ZW2) as color information on the feature points of captured color image (7c). Feature point color conversion calculation unit (23) calculates the color conversion for the feature points of color image (5c) from previously set first color information (XW1, YW1, ZW1), second color information (XW2, YW2, ZW2), and the association of pixels or blocks. Color conversion storage memory (35) records the color conversion for the feature points as a color conversion for representative points. Color conversion calculation unit (37) calculates the color conversion for each pixel or block of the input image from the color conversion for representative points.

In the projector color correcting apparatus, the color conversion comprises an equation or a lookup table or a combination thereof.

To solve the problems mentioned above, a projector of the present invention comprises projector color correcting apparatus (12/13) described in any of the foregoing paragraphs for generating image data corrected for colors based on image data (DI) applied thereto, and projector main body (10) for projecting the image data corrected for colors onto projection plane (2).

According to the present invention, stable color reproduction can be accomplished even in a situation where the projection plane of the projector is not uniform in color. Also, according to the present invention, stable color reproduction can be accomplished even in a situation where there are patterns and the like on the projection plane of the projector. In addition, according to the present invention, stable color reproduction can be accomplished even in a situation where environmental light does not uniformly impinge on the projection plane of the projector. Further, according to the present invention, it is possible to alleviate the influence of lack of uniformity in colors, if the projector itself suffers from the lack of uniformity in colors.

BEST MODE FOR CARRYING OUT THE INVENTION

In the following, embodiments of a projector color correcting apparatus, a projector color correcting method, and a projector according to the present invention will be described with reference to the accompanying drawings.

First, color reproduction in a projector will be described in brief.

Figure 1:
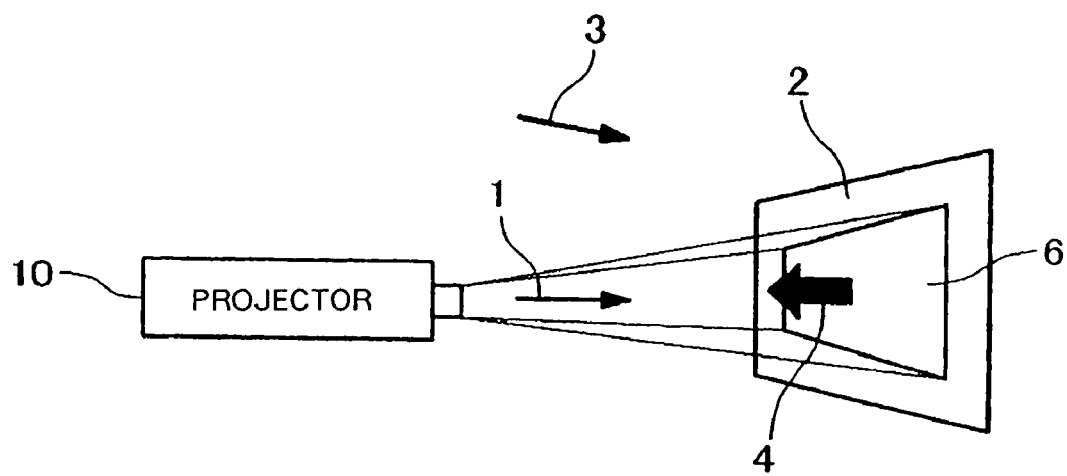
FIG. 1 is a conceptual diagram illustrating an example of color reproduction in a projector.

FIG. 1 is a conceptual diagram illustrating exemplary color reproduction in a projector. Color light 1 projected from projector 10 forms projected image 6 on projection plane 2. Then, color light 1 is reflected on projection plane 2 to produce reflected light 4 which is incident on eyes of a human who recognizes the color of projected image 6. Here, the "projection plane" refers to a plane onto which projector 10 projects an image, such as a screen or a wall.

Here, if ambient light 3 exists in a visual environment, the image color of projected image 6 is determined by reflected light 4 which includes all of the three types of color information which are color light 1 from projector 10, the color of projection plane 2 itself, and ambient light 3. Spectral distribution characteristic Cr(λ) of this reflected light 4 can be expressed by the following equation (1):

[Equation 1]

$$C_r(\lambda) = (C_p(\lambda) + E(\lambda)) \times R(\lambda) \quad (1)$$

Cr(λ): Spectral Distribution Characteristic of Reflected Light 4;
Cp(λ): Spectral Distribution Characteristic of Color Light 1 from Projector 10;
E(λ): Spectral Distribution Characteristic of Ambient Light 3 in Observation Environment;
R(λ): Surface Reflectivity of Projection Plane 2; and
λ: Wavelength of Light.

When spectral distribution characteristic E(λ) of ambient light 3 impinging on projection plane 2 and surface reflectivity R(λ) of projection plane 2 are both uniform in the area of projected image 6 projected from projector 10, color correction can be accommodated by one type of color correcting method.

On the other hand, in the area of projected image 6 on projection plane 2, projected from projector 10, if either surface reflectivity R(λ) of projection plane 2 or spectral distribution characteristic E(λ) of peripheral light 4 is not uniform, spectral distribution characteristic Cr(px, py, λ) of reflected light 4 from coordinates (px, py) on the image of projected image 6 can be expressed in the following manner:

[Equation 2]

$$C_r(px, py, \lambda) = (C_p(\lambda) + E(px, py, \lambda)) \times R(px, py, \lambda) \quad (2)$$

R(px, py, λ): Surface Reflectivity of Projection Plane 2 at Coordinates (px, py) on Image of Projected Image 6; and
E(px, py, λ): Spectral Distribution Characteristic of Ambient Light 3 at Coordinates (px, py).

As shown in the foregoing Equation (2), even if color light Cp(λ) from projector 10 is uniform, Cr(px, py, λ) is not uniform because R(px, py, λ) and E(px, py, λ) are not uniform due to environmental conditions (the color of projection plane 2 and ambient light 3) at coordinates (px, py) on the image of projected image 6. Consequently, this problem must be taken into consideration for realizing color reproduction in projector 10.

Accordingly, in the invention of the present application, in the area of projected image 6 on projection plane 2, projected from projector 10, even when projection plane 2 is not uniform in surface reflectivity and ambient light 3 is also not either uniform in spectral distribution characteristic, the colors of an input image can be stably reproduced with fidelity by correcting colors in units of pixels which make up projected image 6 or on a block-by-block basis.

First Embodiment

In the following, a first embodiment of a projector color correcting apparatus, a projector color correcting method, and a projector according to the present invention will be described with reference to the accompanying drawings.

First, a description will be given of the configuration of the projector color correcting apparatus according to the first embodiment of the present invention.

Figure 2:
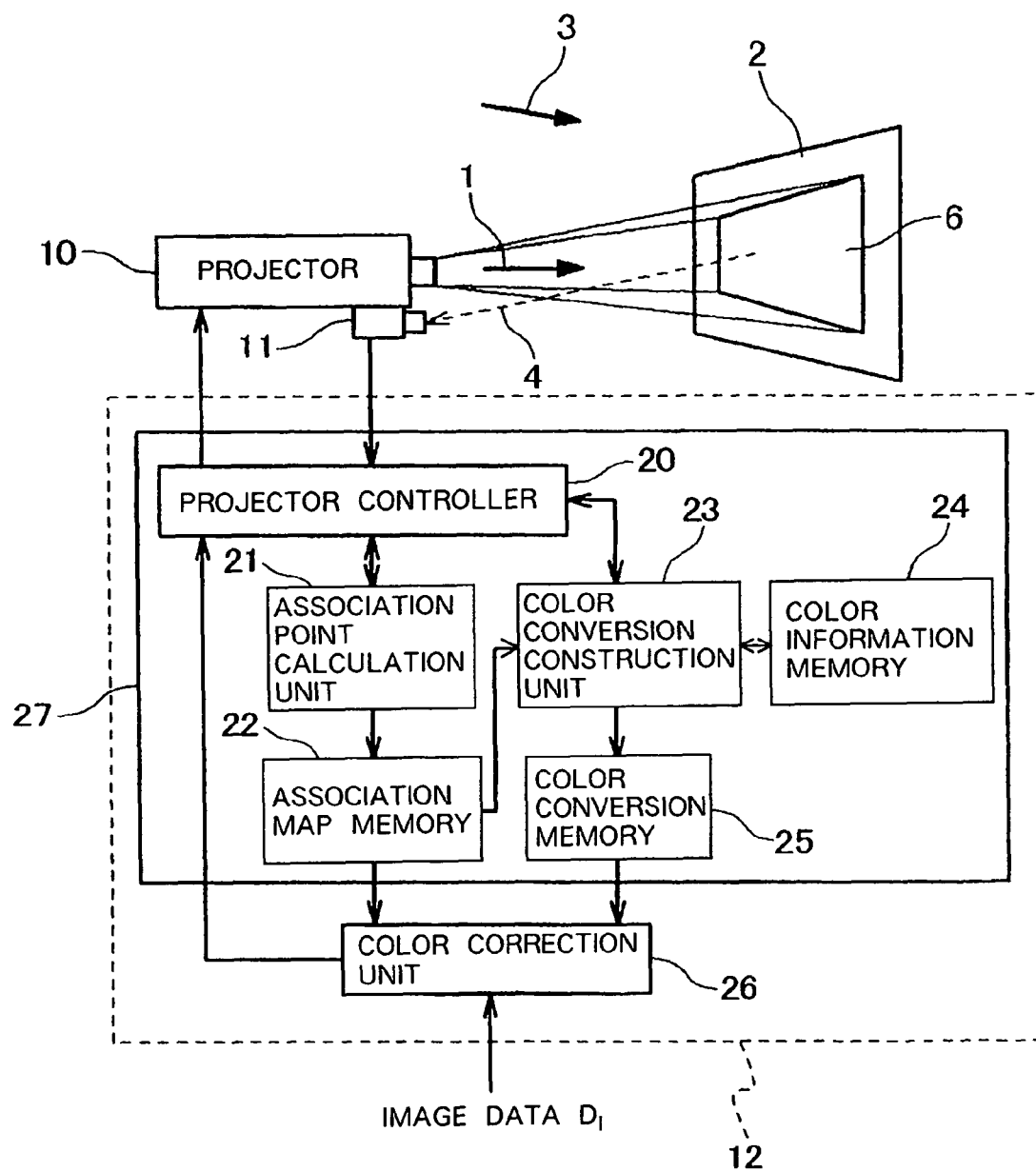
FIG. 2 is a diagram illustrating the configuration of a first embodiment of a projector color correcting apparatus according to the present invention.

FIG. 2 is a diagram illustrating the configuration of the projector color correcting apparatus according to the first embodiment of the present invention. Projector color correcting apparatus 12 comprises projector controller 20, color conversion generation unit 27, and color correction unit 26. Color conversion generation unit 27 comprises association point calculation unit 21, association map memory 22, color conversion construction unit 23, color information memory 24, and color conversion memory 25.

Projector 10 and color correcting apparatus 12 may be such that one includes the other. In this event, the apparatus can be reduced in size.

Projector controller 20 controls the operation of projector 10. In addition, projector controller 20 performs the following operation for acquiring detailed color information on projection plane 2 of projector 10.

Pattern image 5 acquired from association point calculation unit 21 is projected onto projection plane 2. Then, projector controller 20 acquires captured pattern image 7 as a result of capturing pattern image 5 on projection plane 2 by color image sensor 11. Subsequently, captured pattern image 7 is supplied to association point calculation unit 21. Assume herein that pattern image 5 is created such that captured pattern image 7 can cover an overall projection area of projector 10.

Once an association (later described) has been established between pattern image 5 and captured pattern image 7, projector controller 20 projects color image 5c acquired from color conversion construction unit 23 onto projection plane 2. Then, projector controller 20 acquires captured color image 7c as a result of capturing color image 5c on projection plane 2 by color image sensor 11. Subsequently, captured color image 7c is supplied to color conversion construction unit 23. Color image 5c is used for defining a color space on projection plane 2 of projector 10. For example, color image 5c is composed of any set of colors, for example, W (white), W and BK (black), W, R (red), G (green), and B (blue), and W, R, G, B, and K.

Association point calculation unit 21 generates pattern image 5 which is supplied to projector controller 20. Pattern image 5 may be previously stored in a storage unit (not shown) and used. Association point calculation unit 21 also acquires captured pattern image 7 from projector controller 20. Then, association point calculation unit 21 calculates pixels on captured pattern image 7 corresponding to pixels which make up pattern image 5 to find their association.

Association map memory 22 stores association data which indicates an association of pixels between pattern image 5 generated in association point calculation unit 21 and captured pattern image 7e. This association association data indicates an association of pixels between a projected image and the image on the projection plane.

Color conversion construction unit 23 generates color image 5c which is supplied to projector controller 20. Color image 5c may be previously stored in a storage unit (not shown), and used. Color conversion construction unit 23 also acquires captured color image 7c from projector controller 20. Then, color conversion construction unit 23 retrieves color information on captured color image 7c associated with each of the pixels which make up the projected image, based on the association data recorded in association map memory 22, and records the color information in color information memory 24. Then, color conversion construction unit 23 calculates a color space on projection plane 2 of projector 10, indicated by Equation (15), later described, for each pixel to construct a target color space for color conversion. Here, when the color image comprises W or W and BK, color information of R, G, B on the projection plane of the projector is estimated from the color information on W on the projection plane. According to this estimation method, color information on R, G, B can be estimated from color information on W using a regression equation derived by projecting W, R, G, B on the projection plane in various colors, and regressively analyzing the relationship between color information on R, G, B and color information on W. Then, color conversion construction unit 23 constructs a color conversion which matches the appearance of colors from the previously determined original color space and the calculated target color space in accordance with a color correcting method, later described, and records this in color conversion memory 25.

It should be noted that color information memory 24 is not necessarily a memory required in color correcting apparatus 12. In other words, color information on a captured color image associated with each pixel may not be stored in color information memory 24 but may be created as a color conversion which matches the appearance of colors without storing the color information on the captured color image associated with each pixel.

Color correction unit 26 performs a color correction for each pixel of image data Dl supplied thereto in accordance with the color conversion recorded in color conversion memory 25. The corrected image is sent to projector control 20 and projected by the projector.

(I) Next, a description will be given of a method of calculating association data indicative of an association of pixels between a projected image and the image on the projection plane.

Figure 3:
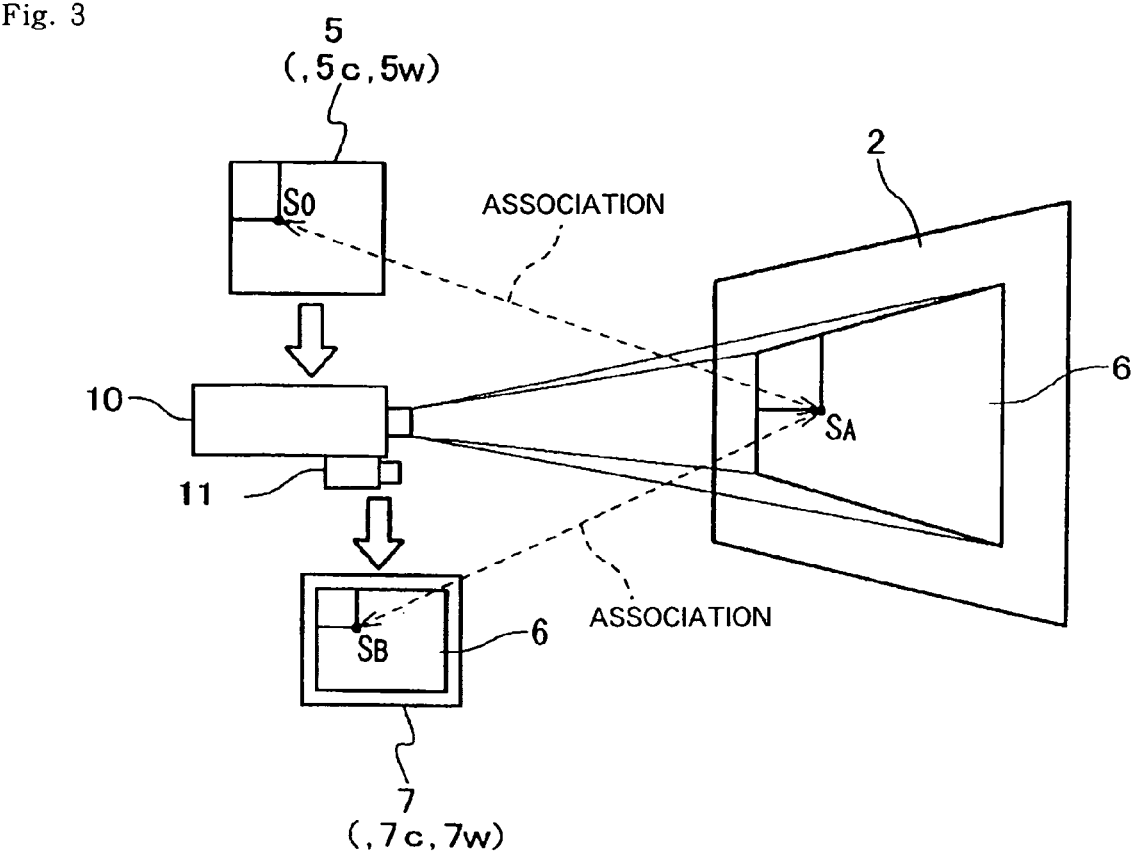
FIG. 3 is a diagram illustrating a method of associating a coordinate position on a pattern image with a coordinate position on a captured pattern image.

FIG. 3 is a diagram for describing a method of automatically associating a coordinate position of pattern image 5 with a coordinate position of captured pattern image 7 using color image sensor 11. First, projected image 6 of pattern image 5 projected onto projection plane 2 by projector 10 is captured by color image sensor 11. Next, captured pattern image 7 of pattern image 5 projected onto projection plane 2 is obtained. Then, association point calculation unit 21 associates a coordinate position of pattern image 5 with a coordinate position of captured pattern image 7 based on pattern image 5 and obtained captured pattern image 7. In the figure, coordinate position S0 of pattern image 5, coordinate position SA of projected image 6, and coordinate position SB of captured pattern image 7 correspond to each other.

Here, pattern image 5 will be described.

Figure 4A:
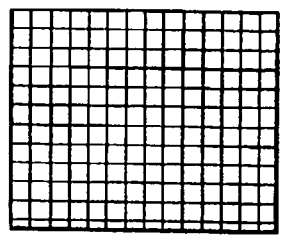
FIG. 4A is a diagram showing an exemplary pattern image.
Figure 4B:
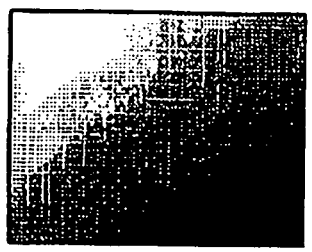
FIG. 4B is a diagram showing an exemplary pattern image.
Figure 4C:
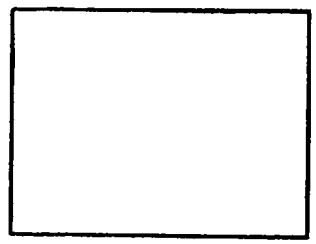
FIG. 4C is a diagram showing an exemplary pattern image.

FIGS. 4A-4C are diagrams showing examples of pattern image 5. Patterns that can be Utilized for pattern image 5 can be, for example, a texture (lattice) image which covers an image area shown in FIG. 4, a gradation which covers an image area shown in FIG. 4B, an uniform image which covers an image area shown in FIG. 4C, and the like. It should be noted that pattern image 5 is not limited to FIGS. 4A-4C but may only be required to provide an association between a coordinate position on pattern image 5 and a coordinate position on captured pattern image 7. In other words, pattern image 5 can include a variety of patterns.

From the viewpoint of the ease of establishing the association of a coordinate position of pattern image 5 with the coordinate position of captured pattern image 7, an image that is preferable to use may give a certain relationship to pixel values for adjacent pixels of a pattern image, such as the gradation image shown in FIG. 4B, because this facilitates the calculation of the association. The lattice image shown in FIG. 4A, on the other hand, is more preferable because it facilitates detection of a feature point in captured pattern image 7 associated with a feature point in pattern image 5. Specifically, since the association calculation can be precisely performed for pixels and blocks by utilizing a gradation image or a lattice image as pattern image 5, the association can be improved in accuracy.

For calculating association data, a feature point may be first set on a pattern image, and a point on captured pattern image 7 may be identified as associated with that feature point, thus finding the association between the two parties. Specifically, the following process is performed.

Figure 5:
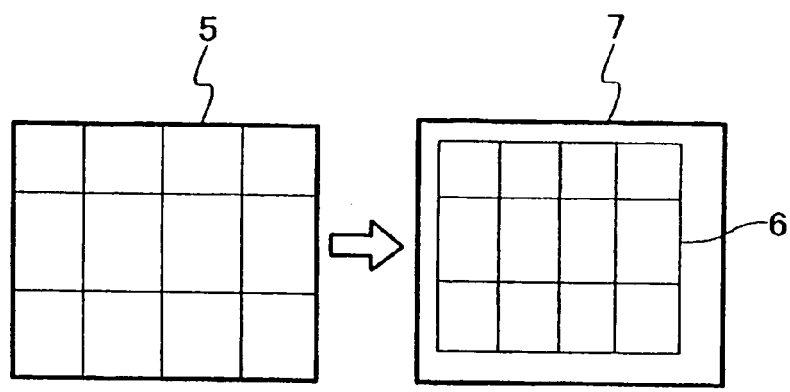
FIG. 5 is a diagram illustrating an exemplary pattern image and captured pattern image.

FIG. 5 is a diagram illustrating an exemplary pattern image and a captured pattern image. The right-hand diagram is pattern image 5 which has a lattice pattern. Feature points are set at the intersections of two line segments. The left-hand diagram is captured pattern image 7. All points associated with the feature points on pattern image 5 are detected from captured pattern image 7 on the left side.

Figure 6:
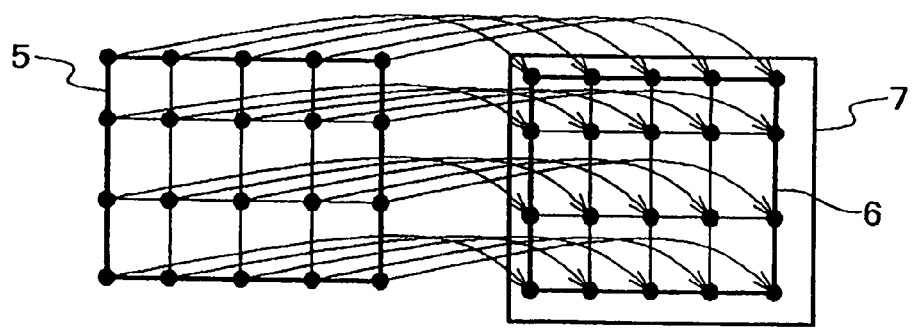
FIG. 6 is a diagram illustrating exemplary mapping of feature points in a pattern image to the feature points in a captured pattern image.

FIG. 6 is a diagram showing an exemplary association of the feature points in the pattern image with those in the captured pattern image. The right-hand diagram is pattern image 5 in FIG. 5, where its feature points are indicated by black dot marks. The left-hand diagram is captured pattern image 7, where the points associated with the feature points on pattern image 5 are indicated by black dot marks. Arrows indicate the association of associated feature points between pattern image 5 and captured pattern image 7.

A method of finding an association between feature points, for example, detects line components from captured pattern image 7 in the case of pattern image 5 in FIG. 5. Since captured pattern image 7 is a color shading image, the line components are extracted using an operator for line component extraction, followed by binarization processing. Here, a variety of methods have been proposed for the detection of line components and binarization processing, and any approach can be utilized in the present invention. For example, the present invention can utilize, by way of example but not limited to it, a line segment detecting method described in Section 8 of a reference document "Image Information Processing (authored by Akyoin and Nakajima, Elementally Information Engineering Series, Morikita Shuppan Kabushiki Kaisha), and a method of binarization processing described in Section 9 of the same, and the like.

When data of a projected lattice pattern has been obtained just as captured pattern image 7 shown in FIG. 5, intersections at which two line segments intersect are found to determine coordinate positions of feature points on captured pattern image 7. When a uniform image or a gradation image is used for pattern image 5, four apices on the periphery are feature points.

It should be noted that the processing for the association of pixels or blocks can be simplified by presenting (projecting) pattern image 5 as a plurality of images such as moving images, or by presenting feature points or pixels as the feature points in pattern image 5 in order and acquire captured pattern image 7 as a plurality of images such as moving images, and scanning them to search points or pixels associated with the feature points.

It should be noted that the association of a coordinate position on pattern image 5 with a coordinate position on captured pattern image 7 can be manually established as well. When pattern image 5 is projected to specify feature points on projected pattern image 5 in a specified order, for example, from upper left in the right direction or the like, using a mouse-based pointer specifying function provided in the projector, it is possible to find coordinate positions on projection plane 2 associated with coordinate positions at feature points on pattern image 5.

After establishing the association between the feature points on pattern image 5 and the feature points on captured pattern image 7, an association is established for the remaining points. Specifically, the following process is performed.

Figure 7:
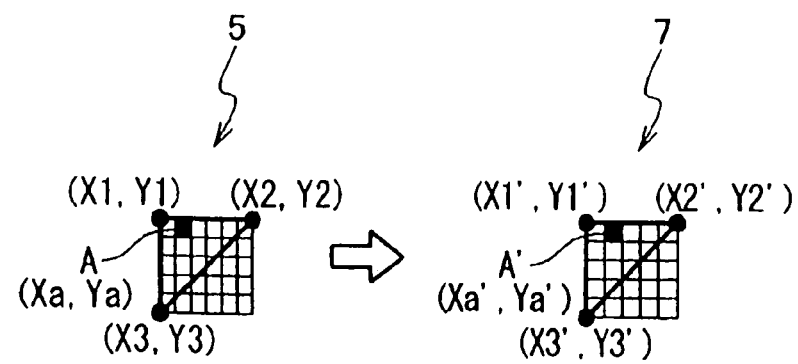
FIG. 7 is a diagram for describing a method of finding an association for a pixel or a block other than feature points.

FIG. 7 is a diagram for describing a method of establishing an association for pixels or blocks other than feature points. First, an association of the feature points is established between pattern image 5 and captured pattern image 7. After establishing the association between the feature points between pattern image 5 and captured pattern image 7, an association of pixels or blocks which make up pattern image 5 with pixels or blocks on captured pattern image 7 is determined from the association of the feature points between pattern image 5 and captured pattern image 7. Consider now that a calculation is made for pixel A' in captured pattern image 7 associated with arbitrary pixel A in pattern image 5. Assume herein that (Xa,Ya) designate the coordinate position of A in pattern image 5, and (PX1, PY1), (PX2, PY2), (PX3, PY3) designate coordinate positions of three feature points which surround pixel A. Assume that (PX1', PY1'), (PX2', PY2'), (PX3', PY3') designate associated points on the captured pattern image for these three feature points, and (PXa', PYa') designate the coordinate of A' on the captured pattern image associated with A. The relationship between A and A' is expressed by the following equation:

[Equation 3]

$$\begin{pmatrix} PXa' \\ PYa' \end{pmatrix} = M \begin{pmatrix} PXa \\ PYa \end{pmatrix} + N \qquad (3)$$

where M is a 2×2 matrix, and N is a 2×1 matrix. Matrix M and matrix N can be readily calculated by simultaneous linear equations from the association of (PX1, PY1), (PX2, PY2), (PX3, PY3) with (PX1', PY1'), (PX2', PY2'), (PX3', PY3'). From the foregoing, it is possible to calculate pixel A' in captured pattern image 7 associated with arbitrary pixel A in pattern image 5. Here, it is easy to substitute block A for pixel A and extend to block A' associated therewith.

Association data can be found through the foregoing process. The association data is stored in map memory 22.

It should be noted that when a gradation image or the like in pattern image 5 is presented (projected) on a pixel-by-pixel basis from the upper right in the left direction and then in the downward direction, and captured pattern image 7 is acquired in synchronization therewith, it is possible to simplify the processing for the association of pixels or blocks without intervention of feature points. In other words, by scanning captured pattern image 7 captured in synchronization with presented pattern image 5, an association can be established between pixels or blocks of the two parties.

(II) Next, a description will be given of a method of performing a color correcting method.

To make a color correction, (i) color information on associated pixels or blocks on captured pattern image 7 is acquired for pixels or blocks which make up pattern image 5. (ii) Next a color conversion is constructed from this color information. (iii) Then, the color correction is made based on the constructed color conversion. Here, a description will be given of a color correction method for one arbitrary pixel which forms part of pattern image 5.

(i) A description will be given of a method of acquiring color information in the color collecting method.

In order to obtain white information in a target color space of the color conversion, white image (signal) 5w is projected in projector 110 to observe reflected light 4 of an associated pixel on projection plane 2. Specifically, the color signal of an associated pixel is obtained in captured white image 7w captured by color image sensor 11, the color characteristic of which is known. Here, the color signal refers to, for example, RGB or the like. Then, the color signal can be converted to a device independent color signal, i.e., tristimulus values XYZ or the like based on the color characteristic of color image sensor 11 and a so-called device dependent color signal generated by color image sensor 11.

Assume that an automatic white balance adjustment function, a γ correction function and the like, generally incorporated in color image sensor 11, are not used in this event, and are fixed to certain set states. Therefore, the color characteristic of the color image sensor is the color characteristic in a fixed set state.

More specifically, white information on the target color space is acquired in the following manner.

For converting device dependent color signals RGB of color image sensor 11, the γ correction of which is fixed to 1.0, to device independent colors XYZ, for example, a linear conversion or the like can be utilized as shown below.

[Equation 4]

$$\begin{pmatrix} X \\ Y \\ Z \end{pmatrix} = M \begin{pmatrix} R \\ G \\ B \end{pmatrix} + \begin{pmatrix} \alpha \\ \beta \\ \gamma \end{pmatrix} \quad (4)$$

where M is a 3×3 RGB→XYZ conversion matrix, (α, β, γ) is a correction term for a black offset or the like. As a method of acquiring M and (α, β, γ) which represent the color characteristic of color image sensor 11, a plurality of color images 5c are captured to generate a set of color signals RGB, which is then applied, and a set of tristimulus values XYZ of a captured color image is measured using a spectrophotometer and applied, and M can be calculated by a least square method or the like such that color difference Eab is minimized in uniform color space CIELAB or the like.

The conversion from device dependent color signals RGB of color image sensor 11 to device independent colors XYZ can be made by an approach which employs a 3×n (n is four or more) RGB→XYZ conversion matrix which considers multiple-order colors such as RG, GB, RGB, an approach which describes RGB selected as representative and associated XYZ in a lookup table (hereinafter called "LUT") and finds XYZ for the remaining colors by an interpolation calculation using LUT, and the like, not limited to Equation (4) which is a linear conversion that consider only first-order colors. The LUT is stored in projector controller 20. Alternatively, color image sensor 11 may directly deliver tristimulus values XYZ which are device independent colors.

Tristimulus values XYZ corresponding to the white signal, derived by the foregoing method, are described as (XW2, YW2, ZW2) which are designated as white information for the target color space of the color conversion. In this way, white information (tristimulus values (XW2, XY2, XZ2)) is acquired for the target.

Next, white information in the original color space is acquired in the following manner.

An association between the white information and arbitrary colors in an input image, which belong to the original color space of the color conversion and are device dependent colors, and device independent colors associated with these colors is acquired from color information which is set for an image to be displayed, and the like.

For example, RGB of an input image are provided as a standard color space of sRGB (IEC61966-2-1) defined by International Electrotechnical Commission (IEC), its white (information) is set in D65, and an association is also defined between RGB and XYZ. Alternatively, when an ICC profile defined by International Color Consortium (http://www.color.org) is given, detailed color information on that image can be obtained from the profile.

For converting RGB of an input image to tristimulus values XYZ, the conversion method described in IEC61966-2-1 can be utilized if RGB of the input image are, for example, sRGB. In addition, in case of failure in acquiring color information on an image displayed by projector 10, reference color information may be previously assumed for the image to utilize this. Assume that (XW1, YW1, ZW1) describes tristimulus values XYZ, obtained in the foregoing manner, which is white information in the target color space of the color conversion. In this way, the while information (tristimulus values (XW1, YW1, ZW1)) is acquired for the original color space.

The foregoing method of acquiring color information can be used for other arbitrary colors as well.

(ii) Next, a description will be given of a method of constructing a color conversion from the color information found in the foregoing manner.

An actual color conversion is constructed based on tristimulus values (XW1, YW1, ZW1) of the white information in the original color space of the color conversion in the projector, and tristimulus values (XW2, YW2, ZW2) which are white information in the target color space. This color conversion converts an arbitrary color in the original color space to a color in the target color space while maintaining the appearance of the color. A description will be herein given of the case where a color matching method of Japanese Patent No. 3072729 is basically used.

Chrominance xy is calculated from tristimulus values (XW1, YW1, ZW1) of white in the original color space. Virtual spectral distribution characteristic I1(λ) is found for illumination in the original color space from the chrominance. Likewise, a chrominance is calculated from tristimulus values (XW2, YW2, ZW2) of white in the target color space. Virtual spectral distribution characteristic I2(λ) is found for illumination in the target color space from the chrominance. Here, the virtual spectral distribution characteristic for the illumination can be found from the tristimulus values of white by introducing a hypothesis that the projection plane is completely white. As such a method, it is possible to utilize, for example, a method described in JP-A-10-229499 by the present inventors. If these chrominances of white do not exist in a range of chrominance determined by the range of relative color temperature assumed by CIE daylight, the user is reported to that effect.

Here, a description will be given of a method of calculating virtual surface reflectivity R1(λ) for arbitrary color A in the original color space from the tristimulus values and from the virtual spectral distribution characteristic.

For RGB of color A, (X1, Y1, Z1) are calculated as tristimulus values XYZ by the aforementioned approach (i) similar to white. Virtual surface reflectivity R1(λ) is calculated for color A in the original color space using tristimulus values (X1, Y1, Z1) of color A, and virtual spectral distribution characteristic I1(λ) of the illumination. The relationship between tristimulus values (X1,Y1,Z1) of color A and virtual surface reflectivity R1(λ) is represented in the following manner.

[Equation 5]

$$X_1 = K_1 \int I_1(\lambda) R_1(\lambda) \bar{x}(\lambda) d\lambda$$

$$Y_1 = K_1 \int I_1(\lambda) R_1(\lambda) \bar{y}(\lambda) d\lambda$$

$$Z_1 = K_1 \int I_1(\lambda) R_1(\lambda) \bar{z}(\lambda) d\lambda \quad (5)$$

where $x(\lambda)$, $y(\lambda)$, $z(\lambda)$ (the bars above the letters are omitted) are color matching functions and known. K1 is an integration constant, and is expressed by the following equation.

[Equation 6]

$$k_1 = \frac{100}{\int I_1(\lambda) \bar{y}(\lambda) d\lambda} \quad (6)$$

For calculating virtual surface reflectivity $R1(\lambda)$, assume that virtual surface reflectivity $R1(\lambda)$ is represented by a finite dimension linear model expressed below, with the introduction of a hypothesis that virtual surface reflectivity $R1(\lambda)$ can be approximated by a weighted sum of base vectors.

[Equation 7]

$$R_1(\lambda) = r_0(\lambda) + a_1 r_1(\lambda) + a_2 r_2(\lambda) + a_3 r_3(\lambda) \quad (7)$$

where $ri(\lambda)$ (i=1–3) is a base vector derived by collecting the surface reflectivities of many objects and analyzing the main components thereof, and represents an average, and a first main component vector to a third main component vector, respectively, all of which are known. Ai (i=1–3) is a weighting coefficient for each base vector, and serves as an unknown characteristic parameter which represents the color of an object.

The substitution of Equation (7) for Equation (5) results in an observation equation related to unknown characteristic parameter ai, which can be calculated.

[Equation 8]

$$\begin{pmatrix} a_1 \\ a_2 \\ a_3 \end{pmatrix} = \begin{pmatrix} M(x, r_1) & M(x, r_2) & M(x, r_3) \\ M(y, r_1) & M(y, r_2) & M(y, r_3) \\ M(z, r_1) & M(z, r_2) & M(z, r_3) \end{pmatrix}^{-1} \begin{pmatrix} X_1 - M(x, r_0) \\ Y_1 - M(y, r_0) \\ Z_1 - M(z, r_0) \end{pmatrix} \quad (8)$$

[Equation 9]

$$M(x, r_i) = K \int I_1(\lambda) \cdot r_i(\lambda) \cdot \bar{x}(\lambda) d\lambda$$

$$M(y, r_i) = K \int I_1(\lambda) \cdot r_i(\lambda) \cdot \bar{y}(\lambda) d\lambda$$

$$M(z, r_i) = K \int I_1(\lambda) \cdot r_i(\lambda) \cdot \bar{z}(\lambda) d\lambda \quad (9)$$

where i=0–3.

By substituting ai (i=1–3) calculated by Equation (8) for Equation (7), virtual surface reflectivity $R1(\lambda)$ can be derived for color A in the original color space.

In other words, virtual surface reflectivity $R1(\lambda)$ can be calculated for an arbitrary color in the original color space.

When a complete white is given in the original color space, its tristimulus values match tristimulus values (XW1, YW1, ZW1) of the illumination in the original color space. Virtual spectral distribution characteristic $I1(\lambda)$ has been previously found for the illumination in the original color space. Therefore, virtual surface reflectivity $RW1(\lambda)$ can be calculated for the complete white in the original color space by using the aforementioned calculation method based on virtual spectral distribution characteristic $I1(\lambda)$ and tristimulus values (XW1, YW1, ZW1) of the complete white.

Consider next that tristimulus values (XW1, YW1, ZW1) of the complete white in the original color space are reproduced in the target color space with completely the same tristimulus values. By using the aforementioned calculation method based on tristimulus values (XW1, YW1, ZW1) of the complete white in the original color space, and virtual spectral distribution characteristic $I2(\lambda)$ of the illumination in the target color space, virtual surface reflectivity $RW2(\lambda)$ can be calculated for the complete white in the target color space.

Now, two virtual surface reflectivities $RW1(\lambda)$ and $RW2(\lambda)$ have been calculated with respect to the complete white, and virtual surface reflectivity $RW3(\lambda)$ is calculated by the following equation such that the complete white appears in the same color in the two color spaces.

[Equation 10]

$$R_{w3}(\lambda) = c \times R_{w1}(\lambda) + (1-c) \times R_{w2}(\lambda) \quad (10)$$

where c is an incomplete chromatic adaptation coefficient corresponding to a state in which the color sense of an observer adapts incompletely, and takes a real value from 0 to 1.0.

Next, a description will be given of colors other than white. First, virtual surface reflectivity $Rf1(\lambda)$ for an arbitrary color in the original color space is calculated by the aforementioned method in a manner similar to the white color that is based on tristimulus values (X1, Y1, Z1) of the arbitrary color and virtual spectral distribution characteristic $I1(\lambda)$. Then, virtual surface reflectivity $Rf2(\lambda)$ for a color corresponding to that color in the target color space is calculated by the following equation.

[Equation 11]

$$R_{f2}(\lambda) = R_{f1}(\lambda) \times cc(\lambda) \quad (11)$$

where $cc(\lambda)$ is a surface reflectivity adaptation coefficient which is a comparison coefficient of each wavelength in a visible light range, and is calculated by Equation (12) from $RW1(\lambda)$ and $RW3(\lambda)$.

[Equation 12]

$$cc(\lambda) = R_{w3}(\lambda) / R_{w1}(\lambda) \quad (12)$$

Tristimulus values (X2, Y2, Z2) are calculated by the following equation for a color corresponding in the target color space to an arbitrary input color in the original color space.

[Equation 13]

$$X_2 = K_2 \int I_2(\lambda) R_{f2}(\lambda) \bar{x}(\lambda) d\lambda$$

$$Y_2 = K_2 \int I_2(\lambda) R_{f2}(\lambda) \bar{y}(\lambda) d\lambda$$

$$Z_2 = K_2 \int I_2(\lambda) R_{f2}(\lambda) \bar{z}(\lambda) d\lambda \quad (13)$$

[Equation 14]

$$K_2 = \frac{100}{\int I_2(\lambda) \bar{y}(\lambda) d\lambda} \quad (14)$$

where k2 is an integration constant.

The target color space has been constructed by finding tristimulus values (X2, Y2, Z2) of the corresponding color in the target color space.

Tristimulus values (X2, Y2, Z2) of a color in the target color space is converted to R2G2B2, which are device dependent colors of the projector, for example, by using a linear transform as shown in Equation (15), or the like.

[Equation 15]

$$\begin{pmatrix} R_2 \\ G_2 \\ B_2 \end{pmatrix} = O \begin{pmatrix} X_2 \\ Y_2 \\ Z_2 \end{pmatrix} + \begin{pmatrix} l \\ m \\ n \end{pmatrix} \quad (15)$$

where transform matrix O represents the color characteristic of projector 10, and is a transform matrix from tristimulus values XYZ of device independent colors to RGB which are device dependent colors of projector 10. (l, m, n) is a correction term for taking into consideration a black offset. R2G2B2 derived by Equation (15) are RGB values when gamma is set to 1.0. If the projector has the gamma characteristic, the R2G2B2 are subjected to a gamma correction. With such a process, color conversion can be constructed.

A correction in color correction unit 26 involves substituting image data (Xl, Yl, Zl) of an input image for (X2, Y2, Z2) in Equation (15) to derive (R2, G2, B2) in Equation (15).

For the case where the projector has four or more basic primary colors, an association between device independent colors and device dependent colors can also be represented by a similar approach in a linear form such as Equation (15) and in the form of gamma correction. By performing the foregoing color conversion processing on all pixels or blocks which make up pattern image 5, color reproduction can be accomplished by the projector without being affected even when projection plane 2 is not uniform in color or even when ambient light 3 is not uniform.

Further, even if a standard color characteristic is provided for projector 10 as represented by Equation (15), the color characteristic of projector 10 is preferably updated by taking into consideration the influence of the color of projection plane 2 and ambient light 3, in order to accomplish highly accurate color reproduction by the projector. Specifically, projector 10 projects an image of W (white) or an image of R (red), G (green) W, or an image composed of R, G, B, W, Bk (black) onto projection plane 2. Color image sensor 11 captures reflected light 4 from projection plane 2 to generate tristimulus values XYZ for each of W or RGBW or RGBWBk using aforementioned Equation (4). Here, when there is only W, tristimulus values XYZ corresponding to RGB can be estimated from tristimulus values XYZ of this W as well. As this estimating method, color information on R, G, B can be estimated from color information on W using a regression equation derived by projecting W, R, G, B onto the projection plane in various colors, and regressively analyzing the relationship between color information on R, G, B and color information on W.

The XYZ→RGB conversion equation of Equation (15) can be derived using the chrominance of each color calculated from the tristimulus values XYZ of each of RGBW (for details, see Joji Tajima, "Discussion on Color Image Duplication, Basic of Color Management" (Maruzen, 1996), Third Section "Color Reproduction of Display"). In this event, (l, m, n) becomes (0, 0, 0). With the use of tristimulus values XYZ for each of RGBWBk, to which Bk (black) is added, the accuracy can be improved by virtue of the term of black shift (l, n, m) in Equation (14).

The effect of enabling the projector to accomplish more accurate color reproduction can be produced by updating Equation (15) for all pixels or all blocks which make up pattern image 5 in a manner similar to the aforementioned color correction method.

While the method of correcting an arbitrary color in an original color space to the color in a target color space, while maintaining the appearance of the color, has been described for a case where the color matching method of Japanese Patent No. 3072729 is applied to a projector, chromatic adaptation models such as a von Kries model, CIELAB, CIECAM97s, Naya 97 model and the like, or color appearance models can be used as well. In other words, the projector color correcting method need not be fixed to one model, but a plurality of models may be installed such that one can be selected in accordance with the preference of the user. Also, some of these models can accomplish more accurate color matching by adjusting conversion parameters, and specifying information about the observarable environment such as the state of illumination which may be dark, gloomy or normal, and the like. For example, the color matching method of Japanese Patent No. 3072729 has incomplete chromatic adaptation coefficient c. More accurate color matching can be accomplished for a projector by providing a user interface for adjusting parameters for such a model.

Figure 12:
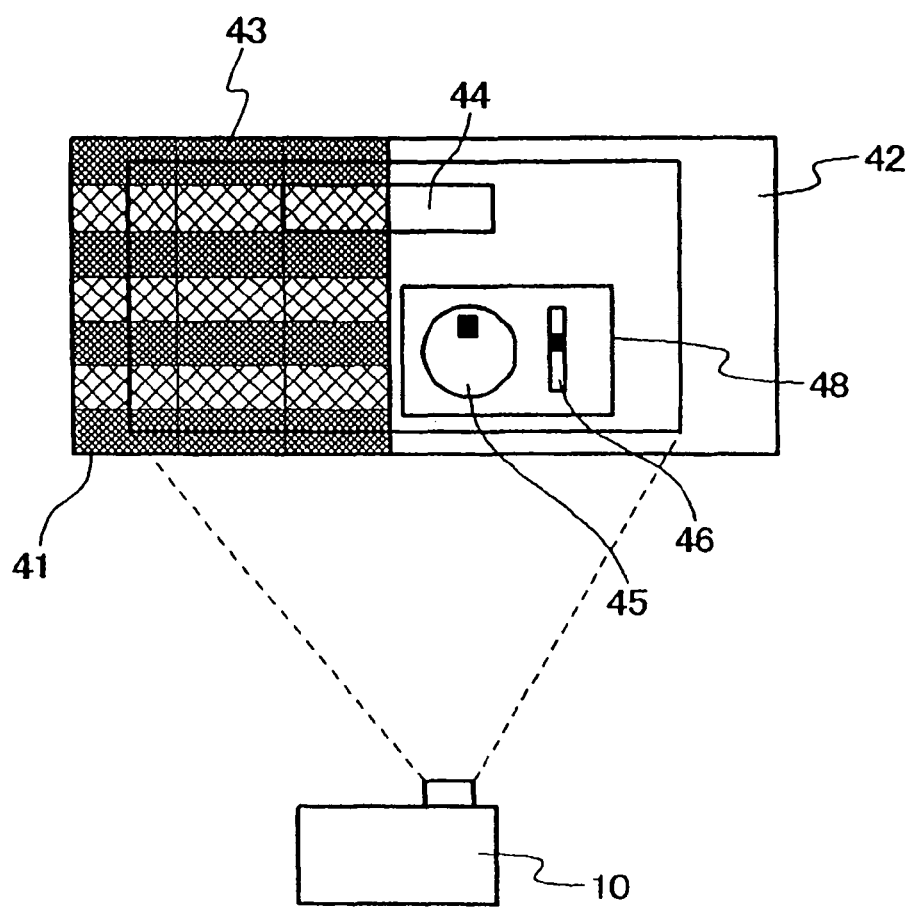
FIG. 12 describes an exemplary graphical user interface.
Figure 13:
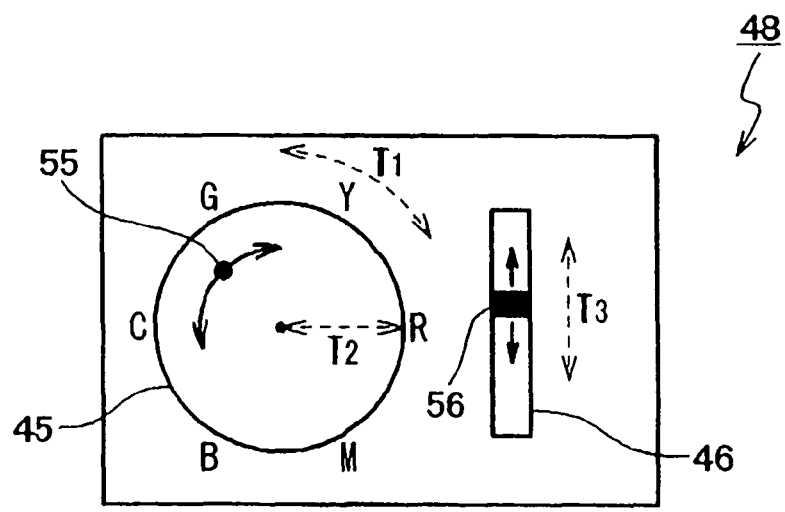
FIG. 13 is a diagram for describing an exemplary graphical user interface for color adjustment.

Here, the projector color correction can be manually made even without a color image sensor. For example, when a projection plane is in a check pattern, one or more types of images in uniform color is projected to specify blocks of the check pattern on the projection plane by using a mouse-based pointer specifying function installed in the projector. Then, projector controller 20 displays a graphical user interface for interactively varying the color of a specified block based on a color correction program stored therein. FIG. 12 describes an exemplary graphical user interface. In this figure, standard white plate 42 is placed so that it is adjacent to specified block 43. Then, white color is projected by projector 10, and the color of color matching block 44 on standard white plate 42 is adjusted using color adjustment GUI 48 so as to match the reproduced color on block 43 of the check pattern. Color adjustment GUI 48 comprises a hue/saturation adjuster 45 and lightness adjuster 46. A round circle represents hue/saturation adjuster 45 for adjusting hue and saturation such as red, yellow, green, cyan, blue, magenta and the like. The center of the circle represents an achromatic color, and the saturation becomes higher at a position further away from the center. In other words, the saturation varies along radial direction T2 of the circle. The hue in turn varies smoothly along circumferential direction T1. A rectangle represents lightness adjuster 45 for adjusting the lightness. The lightness varies along vertical direction T3. Manipulation points 55 and 56 are manipulated by moving them by a pointing device. The color can be adjusted by these two adjustment interfaces. It should be noted that this color adjustment GUI 48 is not limited only to the color adjustment GUI of FIG. 13 but is only required to vary the color of block 44 as the user desires. Likewise, red, green, and blue are projected to match the colors. This operation can result in RGB data on white, red, green, and blue on the standard white plate, matched in color with specified blocks.

Colors reproduced by the projector, when projected onto the standard white plate, are expressed by Equation (15). This equation can be previously calculated and held in a memory of the projector or the like. In other words, if RGB data on colors projected on the standard white pate are available, their tristimulus values XYZ can be derived. Since colors reproduced on the standard white plate match the reproduced colors in blocks of the check pattern on the projection plane, color information calculated from the colors reproduced on the standard white plate can be used for color information on the reproduced colors in the blocks of the check pattern on the projection plane. Consequently, the color correction can be constructed by replacing a portion of acquired color information on the projection plane, in the aforementioned color correcting method, by utilizing a color image sensor with this manual method.

In the case of the foregoing color correction, i.e., the color matching method of Japanese Patent No. 3072729 which converts device dependent input colors of the original color space to tristimulus values XYZ, a calculation equation which integrates Equation (4) with j Equation (15) and coefficients, an approximate equation corresponding thereto and coefficients, or device dependent corresponding colors of the target color space may be preserved in a lookup table for certain representative colors, and for the remaining colors, corresponding colors may be calculated by performing interpolation calculations using the calculation equation and coefficients, approximate equation and coefficients, or corresponding colors preserved in the lookup table. It should be noted that even when there are four or more primary colors of the projector, color correction can be readily accomplished with the lookup table by extending an interpolation method.

Also, by updating the color correction or color conversion (lookup table) on a periodic basis or at a certain timing, fluctuations in color reproduction by the projector and in ambient light over time can be restrained to accomplish more accurate reproduction of colors. As an example of the timing at which the color conversion is updated, the influence of flicker and the like caused by updating the color correction can be restrained for a moving image by updating the color correction simultaneously with detection of a cut point. The color correction can be updated by projecting a white portion onto part of the projection screen. As a technique for improving the image quality utilizing a cut point, it is possible to utilize a method in "Adaptive Automatic Improvement in Image Quality of Moving Image in Consideration of Scene Change" (2001 System Society Conference of the Institute of Electronics, Information and Communication Engineers, D-11-33, pp. 173). Alternatively, it may be possible to update the color correction in response to the user's instructions.

Figure 8:
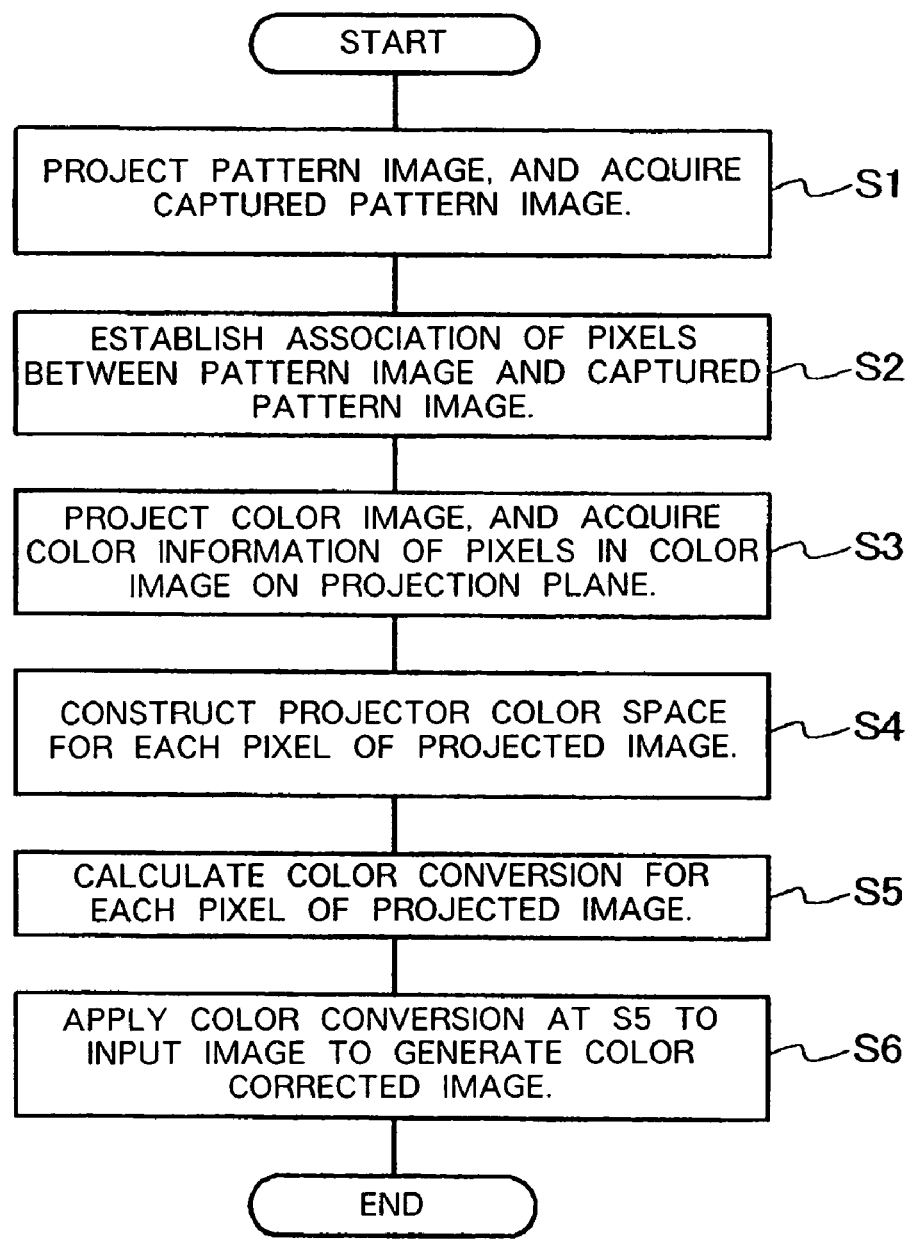
FIG. 8 is a flow chart illustrating the operation of the projector color correcting apparatus according to the first embodiment of the present invention.

Next, a description will be given of the operation in the projector color correcting apparatus according to the first embodiment of the present invention (embodiment of the projector color collecting method). FIG. 8 is a flow chart illustrating the operation in the projector color correcting apparatus according to the first embodiment of the present invention (embodiment of the projector color collecting method).

First, projector controller 20 projects pattern image 5 supplied from association point calculation unit 21 using projector 10. Then, projector controller 20 acquires captured pattern image 7 on projection plane 2 through color image sensor 11 (step S1).

Next, association point calculation unit 21 finds an association of pixels or regions between captured pattern image 7 acquired by projector controller 20 and pattern image 5 using the aforementioned method (I) (step S2). Then, the found association is stored in association map memory 22 as association data.

Subsequently, color conversion construction unit 23 delivers color image 5c of W or W, Bk or R, G, B, W or R, G, B, W, Bk to projector controller 20, causing projector 10 to project color image 5c. Then, color conversion construction unit 23 acquires captured color image 7c received by color image sensor 11 on projection plane 2 from projector controller 20. Color conversion construction unit 23 acquires color information on captured color image 7c corresponding to pixels in a projection area based on the association data recorded in association map memory 22 using the aforementioned methods (II)-(i) (step S3). The color information on captured color image 7c is recorded in color information memory 24.

Color conversion construction unit 23 constructs a target projector color space based on the color information acquired at step S3 for each pixel or certain region of the projection area using the aforementioned method (II)-(ii) (step S4).

Color conversion construction unit 23 constructs a color conversion which matches the appearance of colors based on the original projector color space and the target projector color space for each pixel or each certain region of the projection area using the aforementioned method (I1)-(i) (step S5). The color conversion is recorded in color conversion memory 25.

Color correction unit 26 performs a color correction according to the color conversion at step S5 to generate a color corrected image (step S6).

In the present invention, the color correction can be performed for each pixel or block of an image. In this way, stable color reproduction can be accomplished even in a situation where the projection plane of the projector is not uniform in color. In addition, stable color reproduction can be accomplished even in a situation where patterns are present on the projection plane of the projector. Further, stable color reproduction can be accomplished even in a situation where environmental light does not uniformly impinge on the projection plane of the projector. Accordingly, the accuracy of color reproduction in the projector can be improved.

Figure 9:
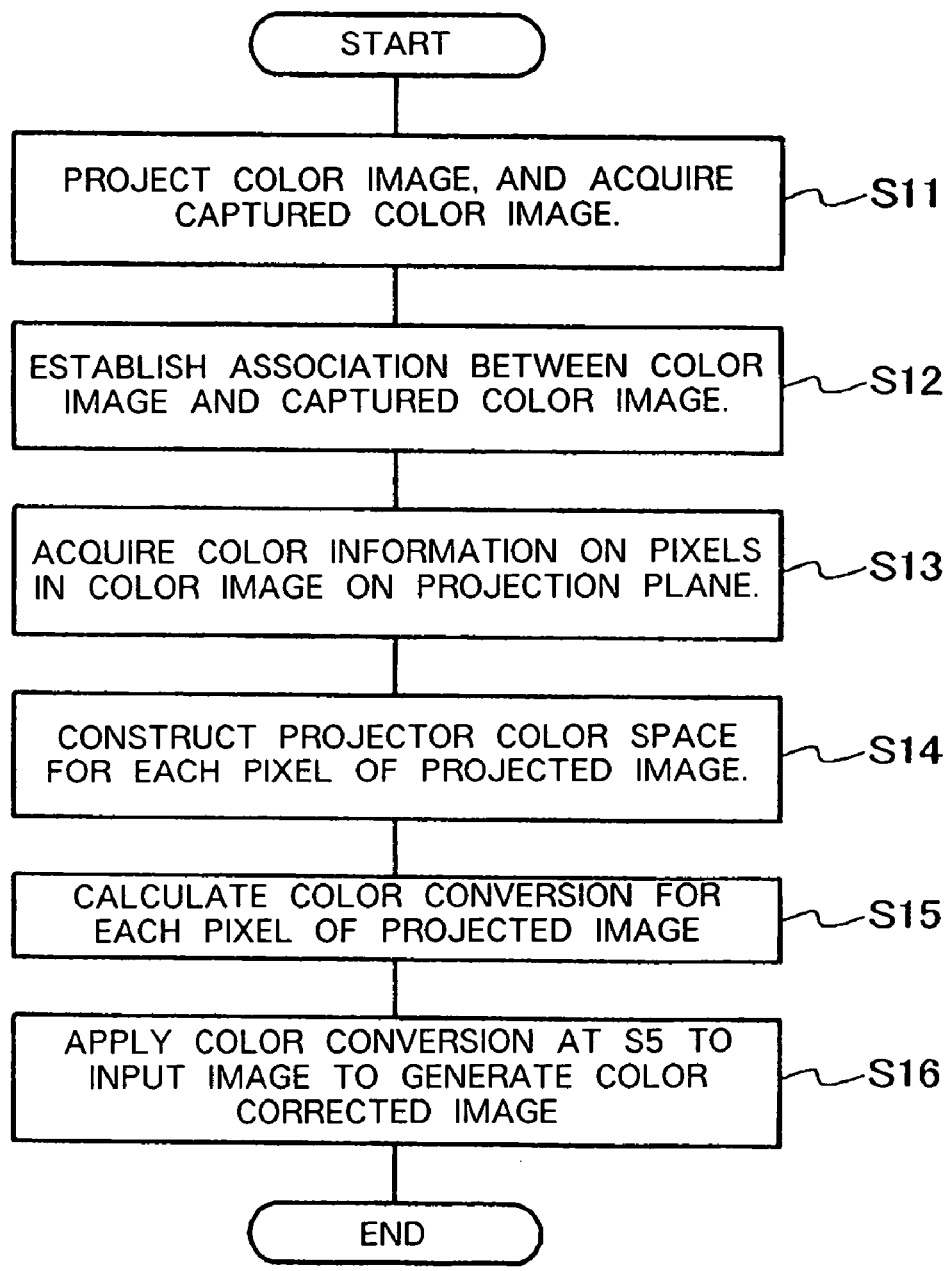
FIG. 9 is a flow chart illustrating an exemplary modification to the operation of the projector color correcting apparatus according to the first embodiment of the present invention.

It should noted that in color correcting apparatus 12 which is the first embodiment, color image 5c projected at step S3 can be projected at step S1 instead of pattern image 5. FIG. 9 illustrates the operation in this case.

FIG. 9 is a flow chart illustrating an exemplary modification of the operation in the projector color correcting apparatus according to the first embodiment of the present invention (embodiment of the projector color correcting method).

First, projector controller 20 projects color image 5c supplied from association point calculation unit 21 using projector 10. Color image 5c is a color image of W, or W and BK, or R, G, B, W, or R, G, B, W, Bk. Then, projector controller 20 acquires captured pattern image 7 on projection plane 2 by color image sensor 11 (step S11).

Association point calculation unit 21 finds an association of pixels or regions between captured color image 7c acquired by projector controller 20 and color image 5c using the aforementioned method (I) (step S12). Then, the found association is stored in association map memory 22 as association data.

Subsequently, color conversion construction unit 23 acquires color information on captured color image 7c associated with pixels in the projection area based on the association data recorded in association map memory 22 using the aforementioned method (II)-(i) (step S13). The color information on captured color image 7c is recorded in color information memory 24.

Steps S14 to S16 are the same as steps S4 to S6.

Second Embodiment

Next, a projector color correcting apparatus according to a second embodiment of the present invention will be described with reference to the accompanying drawings.

Figure 10:
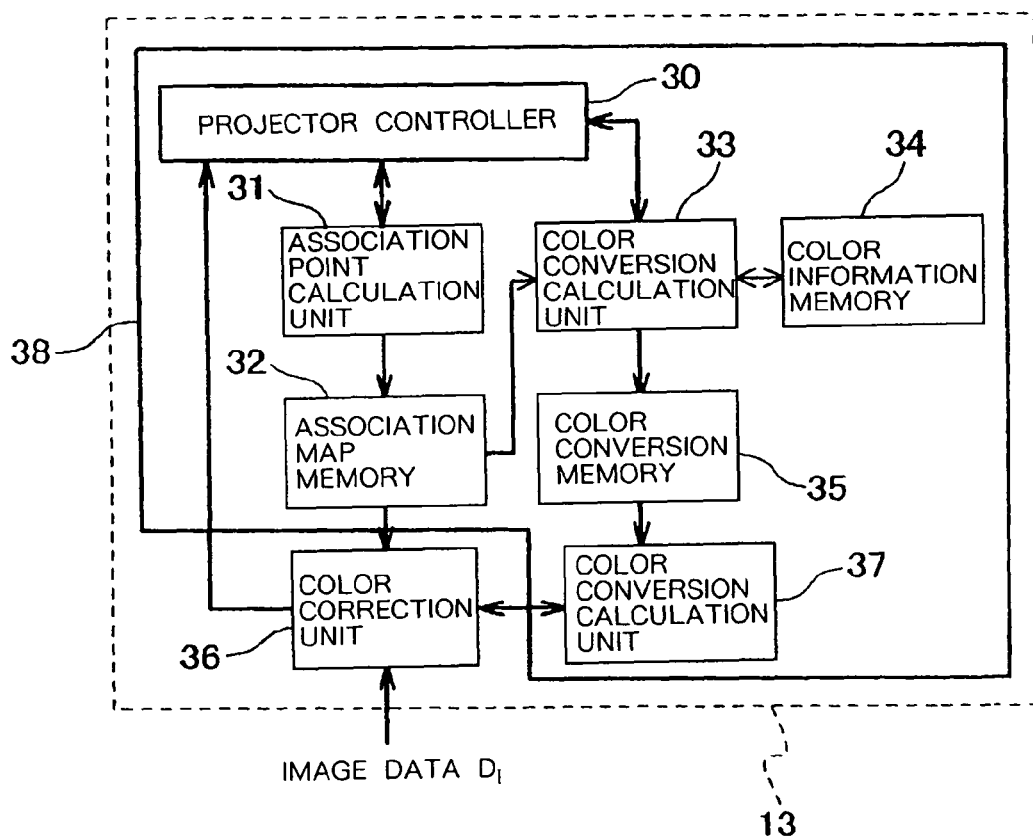
FIG. 10 is a diagram illustrating the configuration of a projector color correcting apparatus according to a second embodiment of the present invention.

First, the configuration of the projector color correcting apparatus according to the second embodiment of the present invention will be described with reference to the accompanying drawings. FIG. 10 is a diagram illustrating the configuration of the projector color correcting apparatus according to the second embodiment of the present invention. Projection color correcting apparatus 13 comprises color conversion generation unit 38 and color correction unit 36. Color conversion generation unit 38 comprises projector controller 30, association point calculation unit 31, association map memory 32, color conversion calculation unit 33, color information memory 34, color conversion memory 35, and color conversion calculation unit 37.

Projector 10 and color correcting apparatus 13 may be such that one includes the other. In this event, the apparatus can be reduced in size.

Projector controller 30 controls the operation of the projector. In addition, projector controller 30 performs the following operation for acquiring detailed color information on projection plane 2 of projector 10.

Pattern image 5 acquired from association point calculation unit 31 is projected onto projection plane 2. Then, projector controller 30 acquires captured pattern image 7 as a result of capturing pattern image 5 on projection plane 2 by color image sensor 11. Subsequently, captured pattern image 7 is supplied to association point calculation unit 31.

Once an association (later described) has been established between pattern image 5 and captured pattern image 7, projector controller 30 projects color image 5c acquired from color conversion construction unit 33 onto projection plane 2. Then, projector controller 30 acquires captured color image 7c as a result of capturing color image 5c on projection plane 2 by color image sensor 11. Subsequently, captured color image 7c is supplied to color conversion construction unit 33. Color image 5c is used for obtaining a color space on projection plane 2 of projector 10. For example, color image 5c is composed of any set of colors, for example, W (white), W and BK (black), W, R (red), G (green), and B (blue), and W, R, G, B, and K.

Association point calculation unit 31 generates pattern image 5 which is supplied to projector controller 30. Pattern image 5 may be previously stored in a storage unit (not shown) and used. Association point calculation unit 31 also acquires captured pattern image 7 from projector controller 30. Then, association point calculation unit 3 calculates pixels on captured pattern image 7 associated with pixels which make up pattern image 5 to find their association.

Association map memory 32 stores association data which indicates an association of pixels between pattern image 5 generated in association point calculation unit 21 and captured pattern image 7. This association data indicates an association between pixels at feature points of the projected image and pixels at the feature points of the image on the projection plane.

Color conversion construction unit 33 generates color image 5c which is supplied to projector controller 20. Color image 5c may be previously stored in a storage unit (not shown), and used. Color conversion construction unit 33 also acquires captured color image 7c from projector controller 30.

Then, color conversion construction unit 33 retrieves color information on captured color image 7c associated with each of the feature points which make up the projected image, based on the association data recorded in association map memory 32, and records the color information in color information memory 34. Then, color conversion construction unit 33 calculates a color space on projection plane 2 of projector 10, expressed by Equation (15), for each feature point to construct a target color space for color conversion. Then, color conversion construction unit 33 constructs a color conversion which matches the appearance of colors from the previously determined original color space and the calculated target color space in accordance with the aforementioned color correcting method, and records the color conversion in color conversion memory 25.

It should be noted that color information memory 34 is not necessarily a memory required in color correcting apparatus 13. In other words, color information on a captured color image associated with each feature point does not have to be stored in color information memory 34 but may be created to match the appearance of colors without storing the color information on the captured color image associated with each feature point.

Color correction unit 36, for performing a color correction for each pixel of an image supplied thereto, forces color conversion calculation unit 37 to calculate a color conversion that corresponds to pixels from the color conversion at feature points, recorded in color conversion memory 35, through an interpolation calculation, to achieve the color conversion for performing the color correction. Then, the color corrected image is sent to projector control 30 and projected by projector 10.

After color correcting apparatus 13 has constructed the color conversion for feature points it, constructs a color conversion for the remaining pixels through an interpolation calculation and the like based on the color conversion which has been constructed for the feature points. Therefore, the second embodiment is effective when the color of projection plane 2 or environmental light 3 gradually varies in the projection area.

Figure 11:
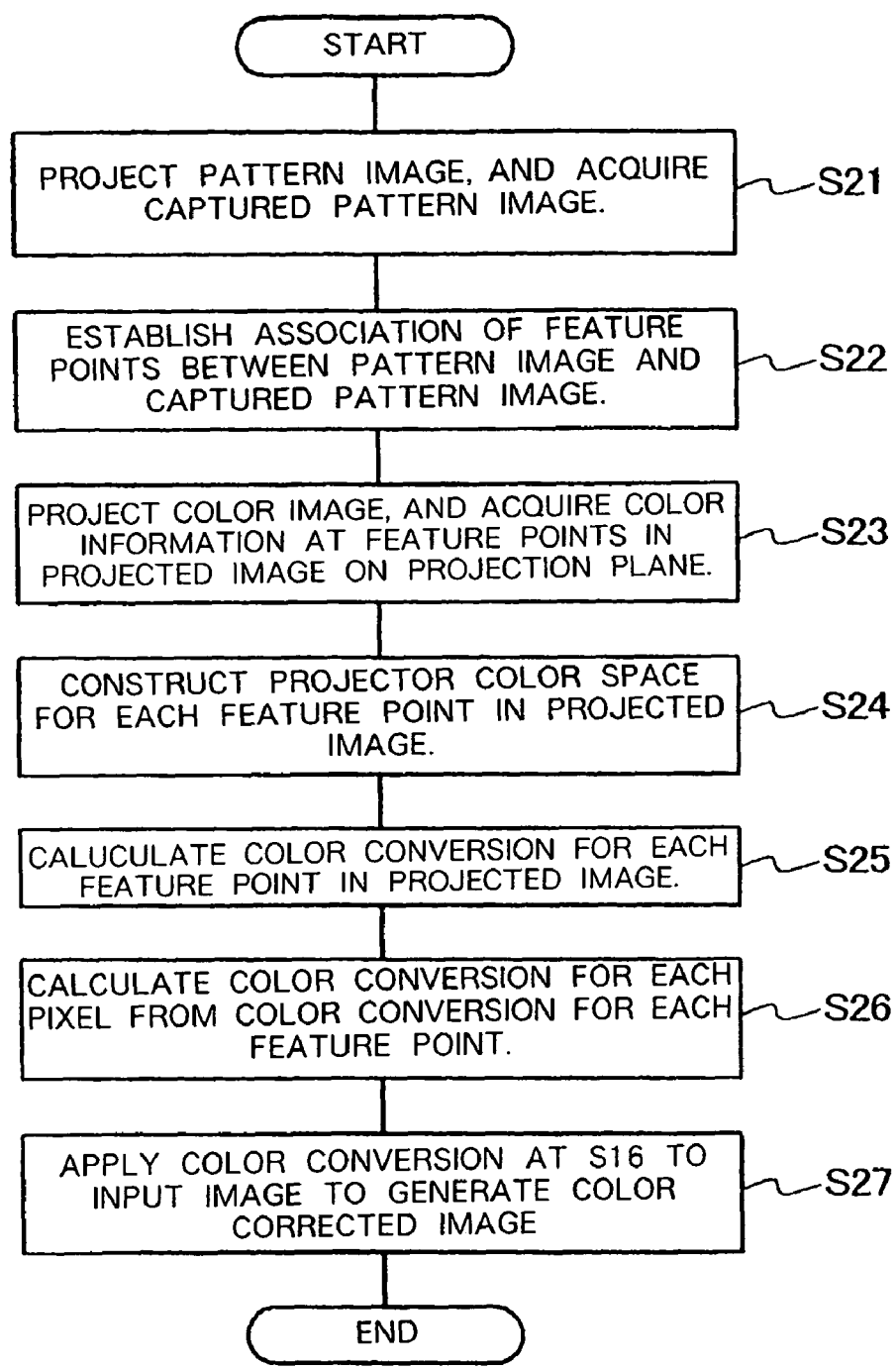
FIG. 11 is a flow chart illustrating the operation of the projector color correcting apparatus according to the second embodiment of the present invention.

Next, a description will be given of the operation of the projector color correcting apparatus according to the second embodiment of the present invention (embodiment of projector color correcting method). FIG. 11 is a flow chart illustrating the operation of the projector color correcting apparatus according to the second embodiment of the present invention (embodiment of the projector color collecting method).

First, projector controller 30 projects pattern image 5 supplied from association point calculation unit 31 using projector 10. Then, projector controller 30 acquires captured pattern image 7 on projection plane 2 through color image sensor 11 (step S21).

Next, association point calculation unit 31 finds an association of feature points between captured pattern image 7 acquired by projector controller 30 and pattern image 5 using the aforementioned method (I) (step S22). Then, the found association is stored in the association map memory as association data.

Subsequently, color conversion construction unit 33 delivers color image 5c of W, or W, Bk or R, G, B, W or R, G, B, W, Bk to projector controller 30, causing projector 10 to project color image 5c. Then, color conversion construction unit 33 acquires captured color image 7c on projection plane 2 received by color image sensor 11 from projector controller 30. Color conversion construction unit 33 acquires color information on captured color image 7c associated with pixels in a projection area based on the association data recorded in association map memory 32 using the aforementioned methods (II)-(i) (step S23). The color information on captured color image 7c is recorded in color information memory 34.

Color conversion construction unit 23 constructs a projector color space of projection plane 2 as a target projector color space based on the color information acquired at step S33 for the feature points of the projection area using the aforementioned method (II)-(ii) (step S24).

Color conversion construction unit 23 constructs a color conversion which matches the appearance of colors at the feature points of the projection area based on the original projector color space and the target projector color space using the aforementioned method (II)-(i) (step S25).

Color conversion calculation unit 37 calculates a color conversion corresponding to each pixel of the input image through interpolation calculation (step S26).

Color correction unit 36 performs a color correction for each pixel of the input image through color conversion at S16 to generate a color corrected image (step S27).

This embodiment can also produce similar effects to those of the first embodiment.

The invention claimed is:

1. A projector color correcting method comprising:
a color conversion generation step for generating a color conversion for each of the pixels or blocks of an image projected onto a projection plane based on previously set first color information and second color information on the image projected onto the projection plane; and
a color correction step for correcting an input image for colors on a pixel-by-pixel or block-by-block basis using the color conversion;
wherein said color conversion generation step comprises:
an association step for projecting the image onto the projection plane, and capturing the image to acquire a captured image for establishing an association between pixels or blocks of the image and pixels or blocks of the captured image;
a color information acquisition step for acquiring the second color information as color information for each pixel or block of the captured image; and
a color conversion calculation step for calculating a color conversion for each pixel or block of the image based on the first color information, the second color information, and said association.

2. A projector color correcting method comprising:
a color conversion generation step for generating a color conversion for each of the pixels or blocks of an image projected onto a projection plane based on previously set first color information and second color information on the image projected onto the projection plane; and
a color correction step for correcting an input image for colors on a pixel-by-pixel or block-by-block basis using the color conversion;
wherein said color conversion generation step comprises:
an association step for projecting a pattern image onto the projection plane, and capturing the pattern image to acquire a captured pattern image for establishing an association of pixels or blocks of the pattern image with pixels or blocks of the captured pattern image;
a color information acquisition step for projecting a color image onto the projection plane, capturing the color image to acquire a captured color image, and acquiring the second color information as color information for each pixel or block of the captured color image; and
a color conversion calculation step for calculating a color conversion for each pixel or block of the color image based on the first color information, the second color information, and said association.

3. The projector color correcting method according to claim 1, including presenting a plurality of the images or the pattern images, acquiring an associated captured image as a captured image associated with the plurality of images, and scanning the associated captured image to establish an association of the pixel or block of the image or pattern image with the pixels or blocks of the captured image or captured pattern image.

4. A projector color correcting method comprising:
a color conversion generation step for generating a color conversion for each of the pixels or blocks of an image projected onto a projection plane based on previously set first color information and second color information on the image projected onto the projection plane; and
a color correction step for correcting an input image for colors on a pixel-by-pixel or block-by-block basis using the color conversion;
wherein said color conversion generation step comprises:
a feature point association step for projecting a pattern image onto the projection plane, capturing the pattern image to acquire a captured pattern image for establishing an association of feature points of the pattern image with feature points of the captured pattern image;
a feature point color information acquisition step for projecting a color image onto the projection plane, capturing the color image to acquire a captured color image, and acquiring the second color information as color information on the feature points of the captured color image;
a feature point color conversion calculation step for calculating a color conversion for the feature points of the color image from the previously set first color information, the second color information, and said association; and
a color conversion calculation step for calculating a color conversion for each pixel or block of the input image by using the color conversion for the feature points as a color conversion for representative points.

5. A projector color correcting apparatus comprising:
a color conversion generation unit for generating a color conversion for each of pixels or blocks of an image projected onto a projection plane based on previously set first color information and second color information on the image projected onto the projection plane; and
a color correction unit for correcting an input image for colors on a pixel-by-pixel or block-by-block basis using the color conversion;
wherein said color conversion generation unit comprises:
an association unit for acquiring a captured image generated by capturing the image projected onto the projection plane to establish an association between pixels or blocks of the image and pixels or blocks of the captured image;
an association storage memory for recording the association;
a color information acquisition unit for acquiring the second color information as color information for each pixel or block of the captured image;
a color conversion calculation unit for calculating a color conversion for each pixel or block of the image based on the first color information, the second color information, and said association; and
a color conversion storage memory for recording the color conversion.

6. A projector color correcting apparatus comprising:
a color conversion generation unit for generating a color conversion for each of pixels or blocks of an image projected onto a projection plane based on previously set first color information and second color information on the image projected onto the projection plane; and
a color correction unit for correcting an input image for colors on a pixel-by-pixel or block-by-block basis using the color conversion;
wherein said color conversion generation unit comprises;
an association unit for acquiring a captured pattern image generated by capturing a pattern image projected onto the projection plane to establish an association of pixels or blocks of the pattern image with pixels or blocks of the captured pattern image;
an association storage memory for recording the association;
a color information acquisition unit for capturing a captured color image generated by capturing a color image projected onto the projection plane to acquire the second color information as color information for each pixel or block of the captured color image;
a color conversion calculation unit for calculating a color conversion for each pixel or block of the color image based on the first color information, the second color information, and said association; and
a color conversion storage memory for recording the color conversion.

7. The projector color correcting apparatus according to claim 5, wherein said association unit presents a plurality of the images or pattern images, acquires an associated captured image as a captured image associated with the plurality of images, and scans the associated captured image to establish an association of the pixel or block of the image or pattern image with the pixels or blocks of the captured image or captured pattern image.

8. A projector color correcting apparatus comprising:
a color conversion generation unit for generating a color conversion for each of pixels or blocks of an image projected onto a projection plane based on previously set first color information and second color information on the image projected onto the projection plane; and
a color correction unit for correcting an input image for colors on a pixel-by-pixel or block-by-block basis using the color conversion;
wherein said color conversion generation unit comprises:
a feature point association unit for capturing a captured pattern image generated by capturing a pattern image projected onto the projection plane, and establishing an association of feature points of the pattern image with feature points of the captured pattern image;
an association storage memory for recording said association;
a feature point color information acquisition unit for acquiring a captured color image generated by capturing a color image projected onto the projection plane, and acquiring the second color information as color information on the feature points of the captured color image;
a feature point color conversion calculation unit for calculating a color conversion for the feature points of the color image from the previously set first color information, the second color information, and said association;
a color conversion storage memory for recording the color conversion for the feature points as a color conversion for representative points; and
a color conversion calculation unit for calculating a color conversion for each pixel or block of the input image from a color conversion for the representative points.

9. A computer readable storage medium storing a computer program for causing a computer to execute a projector color correcting method, said method comprising:
a color conversion generation step for generating a color conversion for each pixel or block of an image projected onto a projection plane based on previously set first color information and second color information of the image projected onto the projection plane; and
a color correction step for correcting the input image for colors on a pixel-by-pixel or block-by-block basis using the color conversion;
wherein said color conversion generation step comprises:
an input step for receiving input through a user interface;
a conversion step for converting the color conversion based on the input;
a color information acquisition step for acquiring the second color information as color information for each pixel or block of the image on the projection plane;
a color conversion calculation step for calculating a color conversion for each pixel or block of the image based on the first color information and the second color information;
an association step for projecting the image onto the projection plane, and capturing the image to acquire a captured image for establishing an association between pixels or blocks of the image and pixels or blocks of the captured image;
a color information acquisition step for acquiring the second color information as color information for each pixel or block of the captured image; and
a color conversion calculation step for calculating a color conversion for each pixel or block of the image based on the first color information, the second color information, and said association.

10. The computer readable storage medium according to claim 9, wherein said color conversion generation step comprises:
an association step for projecting a pattern image onto the projection plane, and capturing the pattern image to acquire a captured pattern image for establishing an association of pixels or blocks of the pattern image with pixels or blocks of the captured pattern image;
a color information acquisition step for projecting a color image onto the projection plane, capturing the color image to acquire a captured color image, and acquiring the second color information as color information for each pixel or block of the captured color image; and
a color conversion calculation step for calculating a color conversion for each pixel or block of the color image based on the first color information, the second color information, and said association.

11. The computer readable storage medium according to claim 9, wherein said method further comprises presenting a plurality of the images or the pattern images, acquiring an associated captured image as a captured image associated with the plurality of images, and scanning the associated captured image to establish an association of the pixel or block of the image or pattern image with the pixels or blocks of the captured image or captured pattern image.

12. The computer readable storage medium according to claim 11, wherein said color conversion generation step comprises:
- a feature point association step for projecting a pattern image onto the projection plane, capturing the pattern image to acquire a captured pattern image for establishing an association of feature points of the pattern image with feature points of the captured pattern image;
- a feature point color information acquisition step for projecting a color image onto the projection plane, capturing the color image to acquire a captured color image, and acquiring the second color information as color information on the feature points of the captured color image;
- a feature point color conversion calculation step for calculating a color conversion for the feature points of the color image from the previously set first color information, the second color information, and said association; and
- a color conversion calculation step for calculating a color conversion for each pixel or block of the input image by using the color conversion for the feature points as a color conversion for representative points.

* * * * *

UNITED STATES PATENT AND TRADEMARK OFFICE
CERTIFICATE OF CORRECTION

| | |
|---|---|
| PATENT NO. | : 7,822,269 B2 |
| APPLICATION NO. | : 10/582542 |
| DATED | : October 26, 2010 |
| INVENTOR(S) | : Tsukada |

It is certified that error appears in the above-identified patent and that said Letters Patent is hereby corrected as shown below:

Column 1, Line 6 in Abstract: Delete "22," and insert -- (22), --

Drawing Sheet 8 of 9, Fig. 11: Delete "CALUCULATE" and insert -- CALCULATE --

Column 4, Line 28: Delete "(Dl)" and insert -- (DI) --

Column 9, Line 47: After "This" delete "association"

Column 10, Line 20: Delete "(Dl)" and insert -- (DI) --

Column 15, Line 26: Delete "$R_1(\lambda)=r_0(\lambda)+a_1r_1(\lambda)+a_zr_2(\lambda)+a_3r_3(\lambda)$" and insert -- $R_1(\lambda)=r_0(\lambda)+a_1r_1(\lambda)+a_2r_2(\lambda)+a_3r_3(\lambda)$ --

Column 17, Line 28: Delete "(Xl, Yl, Zl)" and insert -- (X1, Y1, Z1) --

Column 18, Line 22: Delete "observarable" and insert -- observable --

Column 20, Line 20: Delete "(I1)" and insert -- (II) --

Signed and Sealed this
Tenth Day of May, 2011

David J. Kappos
*Director of the United States Patent and Trademark Office*